United States Patent
Quaid et al.

(10) Patent No.: US 7,683,565 B2
(45) Date of Patent: Mar. 23, 2010

(54) METHOD AND APPARATUS FOR CONTROLLING A HAPTIC DEVICE

(75) Inventors: Arthur E. Quaid, Ft. Lauderdale, FL (US); Hyosig Kang, Weston, FL (US); Dennis Moses, Doral, FL (US)

(73) Assignee: Mako Surgical Corp., Fort Lauderdale, FL (US)

( * ) Notice: Subject to any disclaimer, the term of this patent is extended or adjusted under 35 U.S.C. 154(b) by 368 days.

(21) Appl. No.: 11/804,374

(22) Filed: May 18, 2007

(65) Prior Publication Data
US 2007/0296366 A1 Dec. 27, 2007

Related U.S. Application Data

(60) Provisional application No. 60/801,850, filed on May 19, 2006.

(51) Int. Cl.
*B25J 19/02* (2006.01)
(52) U.S. Cl. .............. 318/568.16; 318/568.12; 700/258; 700/261
(58) Field of Classification Search .............. 318/561, 318/567, 568.17, 568.12, 568.16; 700/85, 700/258, 261; 345/156, 161
See application file for complete search history.

(56) References Cited

U.S. PATENT DOCUMENTS

| | | | | |
|---|---|---|---|---|
| 4,481,453 A | * | 11/1984 | Welburn | 318/696 |
| 4,558,265 A | * | 12/1985 | Hayashida et al. | 318/561 |
| 4,621,332 A | * | 11/1986 | Sugimoto et al. | 700/260 |
| 5,023,808 A | * | 6/1991 | Seraji | 700/248 |
| 5,086,401 A | | 2/1992 | Glassman et al. | |
| 5,322,320 A | * | 6/1994 | Sahashi et al. | 280/5.515 |
| 5,625,576 A | * | 4/1997 | Massie et al. | 703/6 |
| 5,739,811 A | * | 4/1998 | Rosenberg et al. | 345/161 |
| 5,828,197 A | * | 10/1998 | Martin et al. | 318/567 |
| 5,844,392 A | * | 12/1998 | Peurach et al. | 318/568.17 |
| 5,898,599 A | * | 4/1999 | Massie et al. | 345/161 |
| 5,907,487 A | * | 5/1999 | Rosenberg et al. | 700/85 |
| 5,999,168 A | * | 12/1999 | Rosenberg et al. | 345/161 |
| 6,020,876 A | * | 2/2000 | Rosenberg et al. | 345/157 |
| 6,067,077 A | * | 5/2000 | Martin et al. | 345/161 |

(Continued)

OTHER PUBLICATIONS

Course Audit, "Motion Control Made Easy," PTdesign, www.motionsystemdesign.com (Feb.-Oct. 2000) (8 pages).

(Continued)

*Primary Examiner*—Paul Ip
(74) *Attorney, Agent, or Firm*—Foley & Lardner LLP (57) ABSTRACT

A method and apparatus for controlling a haptic device. In one embodiment, the haptic device includes an actuator; an actuator sensor, producing an actuator signal indicative of the actuator velocity; a load; a load output sensor producing a load output signal indicative of the load position; and a controller in electrical communication with the load output sensor, actuator sensor and actuator. The controller controls the actuator in response to the actuator signal and the load output signal to provide a haptic response to a user. In one embodiment, the method for controlling an actuator of a haptic device includes the steps of producing an actuator signal indicative of the velocity of an actuator; producing a position signal indicative of the position of a load; and controlling the actuator in response to the actuator signal and the load output position signal to produce a haptic response to a user.

20 Claims, 6 Drawing Sheets

U.S. PATENT DOCUMENTS

| | | | |
|---|---|---|---|
| 6,084,371 A * | 7/2000 | Kress et al. | 318/566 |
| 6,104,382 A * | 8/2000 | Martin et al. | 345/161 |
| 6,281,651 B1 * | 8/2001 | Haanpaa et al. | 318/568.11 |
| 6,300,937 B1 * | 10/2001 | Rosenberg | 345/156 |
| 6,322,567 B1 | 11/2001 | Mittelstadt et al. | |
| 6,342,880 B2 * | 1/2002 | Rosenberg et al. | 345/161 |
| 6,348,911 B1 * | 2/2002 | Rosenberg et al. | 345/161 |
| 6,396,232 B2 * | 5/2002 | Haanpaa et al. | 318/568.11 |
| 6,522,952 B1 * | 2/2003 | Arai et al. | 700/258 |
| 6,654,665 B2 * | 11/2003 | Arai et al. | 700/258 |
| 6,762,745 B1 * | 7/2004 | Braun et al. | 345/156 |
| 6,946,812 B1 * | 9/2005 | Martin et al. | 318/567 |
| 6,985,133 B1 | 1/2006 | Rodomista et al. | |
| 7,034,476 B2 | 4/2006 | Wang et al. | 318/139 |
| 7,035,716 B2 | 4/2006 | Harris et al. | |
| 7,252,644 B2 * | 8/2007 | Dewald et al. | 601/5 |
| 7,285,932 B2 * | 10/2007 | A'Harrah | 318/638 |
| 7,285,933 B2 * | 10/2007 | A'Harrah | 318/638 |
| 7,308,352 B2 * | 12/2007 | Wang et al. | 701/70 |
| 2004/0034282 A1 | 2/2004 | Quaid et al. | |
| 2005/0184696 A1 * | 8/2005 | Anastas et al. | 318/567 |
| 2006/0079817 A1 * | 4/2006 | Dewald et al. | 601/5 |
| 2006/0142657 A1 | 6/2006 | Quaid et al. | |
| 2006/0187197 A1 * | 8/2006 | Peshkin et al. | 345/156 |
| 2007/0066918 A1 * | 3/2007 | Dewald et al. | 601/5 |
| 2007/0270685 A1 | 11/2007 | Kang et al. | |
| 2008/0007517 A9 * | 1/2008 | Peshkin et al. | 345/156 |
| 2008/0010705 A1 | 1/2008 | Quaid et al. | |
| 2008/0010706 A1 | 1/2008 | Moses et al. | |
| 2008/0048604 A1 * | 2/2008 | Niemeyer et al. | 318/628 |
| 2008/0100252 A1 * | 5/2008 | Tillotson | 318/628 |

OTHER PUBLICATIONS

Davies, B., et al., "Active-Constraint Robotics for Surgery", Proceedings of the IEEE, vol. 94, No. 9, pp. 1696-1704 (2006).

Jakopec, M., et al., "The Hands-On Orthopaedic Robot 'Acrobot': Early Clinical Trials of Total Knee Replacement Surgery", IEEE Transactions on Robotics and Automation, vol. 19, No. 5, pp. 902-911 (2003).

Zinn, M., et al., "A New Actuation Approach for Human Friendly Robot Design", pp. 1-32.

Zinn, M. et al., "A New Actuation Approach for Human Friendly Robot Design", Robotics and Automation Proceedings of the 2004 International Conference on Robotics & Automation New Orleans, LA., vol. 1, Apr. 26-May 1, 2004, pp. 249-154.

Ortmaier T. et al., "A Hands-On-Robot for Accurate Placement of Pedicle Screws," Proceedings of the 2006 IEEE International Conference on Robotics and Automation, May 2006, pp. 4179-4186.

* cited by examiner

METHOD AND APPARATUS FOR CONTROLLING A HAPTIC DEVICE

RELATED APPLICATIONS

This application claims priority to U.S. Provisional Patent Application 60/801,850 filed on May 19, 2006, the disclosure of which is herein incorporated by reference in its entirety.

FIELD OF THE INVENTION

The invention relates generally to the field of haptic devices and more specifically to the field of haptic device controllers.

BACKGROUND OF THE INVENTION

Cable drive haptic devices incorporate a cable transmission having a proximal (or drive) end and a distal (or load) end. The proximal end includes actuators (such as but not limited to motors) that drive the transmission to thereby transmit load to an endpoint of the distal end. Typically, the endpoint of the haptic device is disposed in physical space and a haptic rendering algorithm generates virtual haptic surfaces (or haptic objects) that are located in the physical space. The haptic device enables a user to interact with the virtual haptic surfaces, for example, by controlling the actuators to transmit a load to the distal end of the transmission when the endpoint encounters a haptic surface. The user typically grasps the distal end of the haptic device or a tool or device attached to the distal end of the haptic device. In this manner, the haptic device enables the user to "feel" the haptic surface.

Conventional cable drive haptic devices may include sensors (e.g., position sensors such as encoders) mounted with the actuators at the proximal end of the cable transmission. Data from the actuator sensors (e.g., motor angles) is input to a forward kinematics process to calculate a position of the endpoint. Although this scheme permits good haptic performance of the haptic device, one drawback is that the calculated position of the endpoint, and thus the haptic surfaces, in physical space may not correspond to the actual position of the endpoint due to compliance and hysteresis in the cable transmission. For example, when the user applies a force to the distal end of the haptic device, the cable transmission may flex, resulting in endpoint movement even if the controller maintains the actuator output position. That is, the compliance of the cables of the cable transmission permits some movement of the endpoint even if the actuator attempts to respond to maintain a desired position. This movement results in an error between the actual endpoint location relative to the location of the endpoint as computed by the controller based on the actuator output position.

For haptic applications where a user interacts with a virtual environment, such as when using a conventional cable drive haptic device to modify a virtual CAD model where the haptic device enables the user to "feel" the surfaces of the virtual CAD model, the inaccuracy between the actual endpoint position of the haptic device and the calculated endpoint position is not important because it is not necessary to locate precisely the haptic surfaces in the physical workspace of the haptic device. Thus, the haptic surfaces can be initially positioned anywhere convenient within the workspace without affecting the user's interaction with the virtual environment. For this reason, the endpoint positioning accuracy of conventional cable drive haptic devices is rarely even considered as important. In addition, such haptic devices are generally designed to be compact and have minimal moving mass and inertia, so they typically will not have extra position sensors, especially on the load end of the transmission, where the sensors will have a larger deleterious effect on the haptic performance.

Some haptic applications, however, may require a high degree of endpoint positioning accuracy. For example, in computer aided surgery where a surgeon uses a haptic device to perform a surgical cutting operation, the haptic surfaces define a cutting boudary for a cutting tool attached to the haptic device and thus must be precisely positioned in the physical space of the patient. To provide sufficient endpoint positioning accuracy, a haptic device with a stiff transmission, such as a geared transmission, may be used. One drawback of stiff transmissions, however, is that they may not be backdriveable and/or suitable for use in a haptic device. Although conventional cable drive haptic devices are backdriveable, they present the endpoint positioning accuracy problem described above. One possibility for improving the endpoint positioning accuracy is to relocate the sensors from the proximal (or drive) end to the distal (or load) end of the cable transmission, such as relocating the sensor from the actuator to the joint. This permits a more accurate determination of the position of the endpoint. Relocating the sensors to the load end of the cable transmission, however, may cause the controller to exhibit instability because the sensing and actuation are not located at the same place and are connected by a transmission that is not rigid and has dynamics that can be excited by the controller. Additionally, when a haptic device includes sensors on only one side of the cable transmission, the controller lacks additional information useful for improving the stability of haptic control, which allows for increased haptic wall stiffness. Increased haptic wall stiffness is important when the haptic device is used in computer aided surgery because the haptic surfaces must sufficiently convey to the surgeon the location of the tool with respect the actual tissue surface.

Other conventional positioning devices and industrial robots may also require precise endpoint positioning, but, unlike a haptic device, these devices usually have stiff transmissions and rely solely on actuator position sensors for control. In some cases, positioning systems use both drive and load end position sensors, but these systems are typically used for positioning and not for user interaction or rendering haptic objects.

Thus, a need exists for a cable drive haptic device capable of compensating for compliance and hysteresis in the cable transmission to enable rendering of haptic surfaces in precise locations in physical space with sufficient wall stiffness to accurately and robustly guide the actions of a user. The use of both actuator and load position sensors improves haptic wall stiffness in two ways. First, without the load position sensors, when the user applies a force to the end of the device, the transmission will flex and the endpoint will move, even if the controller maintains the actuator output position. That is, the compliance of the cables of the system permits some movement even if the actuator attempts to respond to maintain haptic position. This movement of the endpoint will then result in an error in the tip location relative to the location of the tip as computed by the controller based on the actuator output position.

Second, the use of both actuator and load output position provides additional information that the controller can use to help improve the stability of the haptic control, allowing for increased haptic wall stiffness. While there are many ways in which to use two input sensors to compute a haptic control output, using the actuator output position sensor to provide a velocity signal and using the load output position sensor to provide the load output position signal to the control algorithm is a simple, fast method that enhances the stability and accuracy of the device compared to single sensor solutions. Increased haptic wall stiffness is particularly important, for example, when the haptic device is used in computer aided surgery because the haptic surface must accurately and robustly convey to the surgeon the location of the tool with respect the actual tissue surface. The present invention addresses these needs.

SUMMARY OF THE INVENTION

The invention relates to a method and apparatus for controlling a haptic device.

In one aspect, the invention relates to a haptic device. In one embodiment, the haptic device includes an actuator; an actuator sensor in communication with the actuator, the actuator sensor producing an actuator signal indicative of the actuator velocity; a load; a load sensor in communication with the load, the load sensor producing load signal indicative of the load position; and a controller in electrical communication with the load sensor, the actuator sensor and the actuator. The controller controls the actuator in response to the actuator signal and the load signal to provide a haptic response to a user.

In another embodiment, the haptic device includes a cable drive transmission in communication with the actuator and the load. In yet another embodiment, the controller determines a gravity compensation torque and a Cartesian endpoint position in response to the load signal. In still yet another embodiment, the controller controls the actuator by computing an endpoint velocity by filtering the actuator signal to form a filtered actuator velocity and multiplying the filtered actuator velocity by a Jacobian.

In another embodiment, the controller computes a damping force by subtracting a reference velocity from the endpoint velocity to form an endpoint velocity difference and multiplying the endpoint velocity difference by a damping gain. In yet another embodiment, the controller computes a desired haptic force in response to the damping force.

In still yet another embodiment, the load sensors are selected from the group comprising optical encoders, electric encoders, magnetic encoders, and potentiometers.

In another aspect, the invention relates to a method for controlling an actuator of a haptic device. In one embodiment, the method includes the steps of producing an actuator signal indicative of the velocity of an actuator; producing a load signal indicative of the position of a load; and controlling the actuator in response to the actuator signal and the load signal to produce a haptic response to a user.

In another embodiment, the method includes the step of determining a gravity compensation torque and a Cartesian endpoint position in response to the load signal. In another embodiment, the controlling of the actuator includes the step of computing an endpoint velocity by filtering the actuator signal to form a filtered actuator velocity and multiplying the filtered actuator velocity by a Jacobian. In still yet another embodiment, the method includes the step of computing a damping force by subtracting a reference velocity from the endpoint velocity to form an endpoint velocity difference and multiplying the endpoint velocity difference by a damping gain. In another embodiment, the method includes computing a desired haptic force in response to the damping force.

In yet another embodiment, the invention is a haptic device including an actuator; an actuator sensor in communication with the actuator, the actuator sensor producing an actuator signal indicative of the actuator velocity; a load; a load sensor in communication with the load, the load sensor producing a load signal indicative of the load position; and a controller in electrical communication with the load sensor, the actuator sensor and the actuator, the controller controlling the actuator in response to the actuator signal and the load signal to provide a haptic response to a user.

In still yet another embodiment, the invention is a haptic device including a transmission having an input side and an output side; an actuator in communication with the input side; an actuator sensor in communication with the actuator, the actuator sensor producing a actuator signal indicative of the actuator velocity; an position sensor in communication with the output side, the position sensor producing a position signal indicative of the position of the output side; and a controller in electrical communication with the position sensor, the actuator sensor and the actuator, the controller controlling the actuator in response to the actuator signal and the position signal to provide a haptic response to a user.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

DESCRIPTION OF A PREFERRED EMBODIMENT

Figure 1:
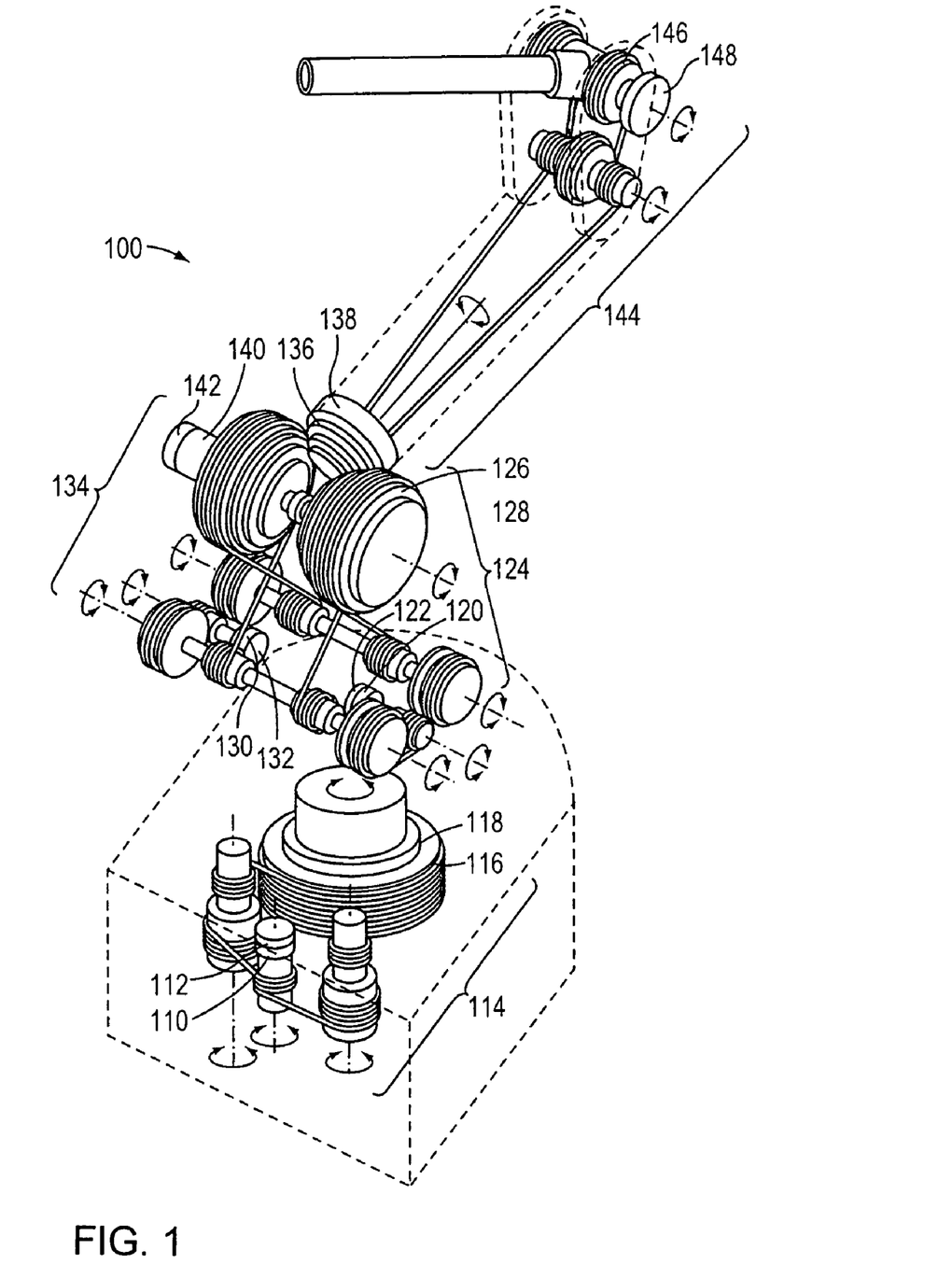
FIG. 1 is a perspective diagram of an embodiment of a cable drive system.

Referring to FIG. 1, an embodiment of a portion of a cable drive haptic device of the invention is shown. The cable drive haptic device comprises an arm 100 that includes cable drive transmissions 114, 124, 134, 144, which are all backdriveable. For each transmission 114, 124, 134, 144, rotary actuators 110, 120, 130, 140 are positioned at one end of the respective transmission (i.e., the proximal or drive end) and joint links 116, 126, 136, 146 are positioned on the other end (i.e., the distal or load end) of the respective transmission. The arm 100 is equipped with four drive end sensors 112, 122, 132, 142 installed on rotary actuators 110, 120, 130, 140 as well as four load end sensors 118, 128, 138, 148 installed on joint links 116, 126, 136, 146.

In this embodiment, the cable drive transmissions provide a gear reduction so that smaller actuators can be used without introducing backlash, friction, or other non-linear effects that make control difficult. However, because the cables introduce some compliance and hysteresis, it is advantageous to include the sensors 118, 128, 138, 148 on the load end of each transmission 114, 124, 134, 144 to provide sufficient endpoint positioning accuracy. Because of control problems caused when sensors and actuators are not located at the same position, it is advantageous to also include the sensors 112, 122, 132, 142 on the drive end of each transmission 114, 124, 134, 144.

The sensors of the haptic device may be position sensors, such as, for example, optical encoders, electric encoders, resolvers, magnetic scale sensors, magnetostrictive sensors, potentiometers, RVDTs, sychros, and the like. In one embodiment, the drive end sensors are actuator encoders, and the load end sensors are joint encoders. The sensors may be incremental and require a homing process. As is well known, the homing process initializes the sensor (e.g., an encoder) so that an initial position of the sensor is known. Homing may be accomplished, for example, by manually rotating the sensor to a reference position or until an index marker on the sensor is read. The reference position or index marker correlates to a known absolute position of the sensor. Once the sensor is homed, subsequent positions of the sensor are calculated based on the known absolute position and the subsequent displacement of the sensor. Alternatively, the sensors may be absolute sensors (e.g., absolute encoders) that do not require a homing process.

The position sensors provide position measurements. If desired, velocity, which is a derivative of position, may be calculated based on position data from the position sensors. Alternatively, velocity can be measured directly using velocity sensors such as, for example, tachometers. In embodiments where a particular sensor is used to determine only velocity, it is not necessary to use an absolute sensor or a sensor with a reference position or index marker as described above in connection with the homing process. However, for safety purposes, it is preferable to use such sensors so that, in addition to being used to determine velocity, the sensor can also provide a redundant position measurement.

In use, a haptic device provides tactile feedback, such as vibration or force feedback, to a user in contact with the haptic device. For example, a haptic device may activate actuators to produce force and/or torque (e.g., based on a haptic rendering algorithm) that is applied to the user as the user manipulates the haptic device. This force feedback is perceived by the user as a virtual constraint (for example a virtual wall) and constrains the user's movement of the haptic device in certain directions. The virtual wall, therefore, is capable of preventing motion in a direction that would be detrimental to the operation being performed. For example, if the user is a surgeon using a burr coupled to the haptic device to remove bone, a virtual wall can be defined so that the haptic device will generate a force that prevents the surgeon from moving the burr beyond a certain depth into the bone. In preferred embodiments, the haptic device is a haptic device as described in U.S. patent application Ser. No. 11/357,197 (Pub. No. US 2006/0142657), filed Feb. 21, 2006, and hereby incorporated by reference herein in its entirety, and/or the HAPTIC GUIDANCE SYSTEM manufactured by MAKO SURGICAL CORP.®, Ft. Lauderdale, Fla.

Figure 2:
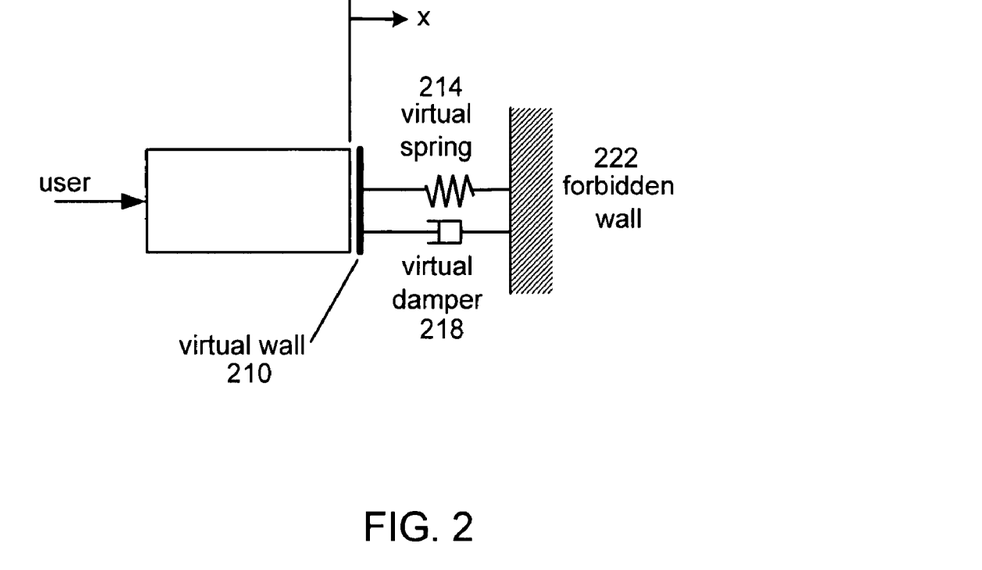
FIG. 2 is a diagram of an embodiment of a model of a one dimensional constraint.

Virtual constraints can restrict the operator in from one to six degrees of freedom. In FIG. 2, a model of a single degree of freedom virtual wall 210 is implemented with a virtual spring 214 and a virtual damper 218 for a rigid link manipulator such that a tool located at the distal end of the rigid link manipulator is prevented from penetrating a forbidden wall 222. In this case, actuator and sensor are co-located, which results in good haptic stability characteristics. However, for a flexible load system (such as a cable drive transmission system), haptic rendering suffers instability as well as reduced haptic performance. Also, although the case of FIG. 2 is for co-located actuator and sensor, in cases where the actuator and sensor are not in the same location, for a flexible transmission system, the dynamics due to the elastic transmission components introduce additional haptic control difficulties. This results in non-minimum phase response.

Figure 2A:
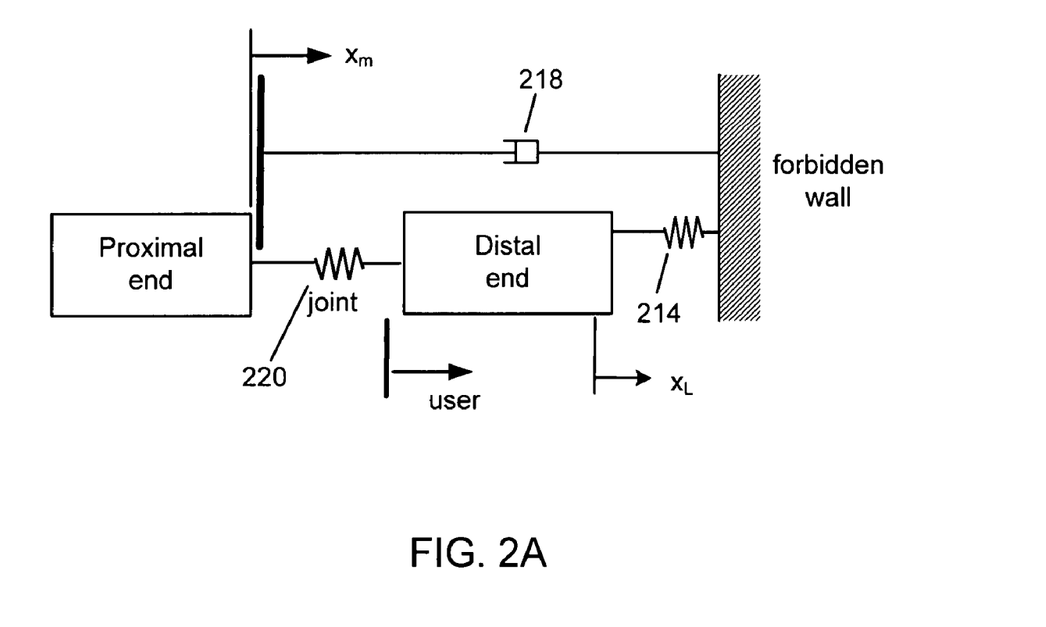
FIG. 2A is a diagram of an embodiment of a model of a one dimensional constraint implemented according to the present invention.

Referring to FIG. 2A, a diagram of a preferred implementation of a virtual wall model is shown for cases where there is a physical compliance in the transmission 220. A position sensor is placed at the proximal (or drive) end. The proximal sensor may also be referred to, for example, as the actuator sensor. Similarly, a position sensor is placed at the distal (or load) end. The distal sensor may also be referred to as the load sensor or the joint sensor. For example, an encoder installed at the distal end (e.g., a joint encoder) provides position information while velocity is computed from signals of an encoder mounting at the proximal end (e.g., an actuator encoder). A virtual spring 214 is implemented with position information from the distal sensor, and a virtual damper 218 is implemented with velocity information computed from the proximal sensor. Using the proximal sensor to compute haptic controller velocity terms and the distal sensor to compute haptic controller position terms is more stable than when the distal sensor is used to compute the position as well as the velocity terms. This "dual sensor" haptic control of FIG. 2A can be easily extended into multi-axis manipulators such as serial manipulators or parallel manipulators that have elastic load members.

In another embodiment, the invention utilizes a tracking system (e.g., global GPS, RF, laser tracking, high-speed camera, etc.) that tracks an end effector or other portion of the haptic device. This tracking system obviates the need for the load sensor, which may be difficult to design into the haptic device without adding mass, size, and complexity. However, to replace the load sensors without degrading the performance, the tracking system must be fast enough (haptic rates) and have low latency and good dynamic performance.

In still another embodiment, one or more independent mechanical arms may be attached to portions of the haptic device and used instead of the integrated load sensors to provide the measurement of the position of the load side of the transmission. The mechanical arm may be an articulated linkage that includes position sensors to enable a position of an end of the mechanical arm to be determined or tracked. Thus, by coupling the tracked end of the mechanical arm to the load end of the haptic device, the position of the load end may be determined. In one embodiment, the mechanical arm comprises an articulating linkage as disclosed, for example, in U.S. Pat. No. 6,322,567,which is hereby incorporated by reference herein in its entirety. Alternatively, instead of a mechanical arm with linkages, one or more string potentiometers or fiber-optic position sensing devices may be used. Using these other technologies to track the end effector or endpoint of the haptic device has an advantage over sensing the individual joints of the device with a load sensor. In particular, such technologies also measure any physical compliance from the structure of the haptic device between where the load sensors are mounted and the endpoint of the device. As a result, this compliance can be compensated for by the control system in the same manner as the control system compensates for transmission compliance.

Regardless of the type of load end sensor chosen it must have sufficient resolution, especially because sensors do not have the benefit of a transmission ratio. For example, given a transmission ratio of 30,for a load encoder to have an equivalent endpoint precision relative to an actuator encoder with 10,000 counts per revolution, the load encoder would need to have 300,000 counts per revolution. High resolution position sensors include optical encoders with read heads that can interpolate 10× to 100× relative to the physical lines on the encoder disc; large diameter encoders with many lines possibly combined with interpolating read head; and interpolating read heads used with tape-scales that can be applied to the outer diameter of a rotating portion of the joint of interest. Large diameter or tape-scale encoders may have packaging advantages in that they can be mounted outside of shafts, brakes, axles, or cable routing holes.

Figure 3:
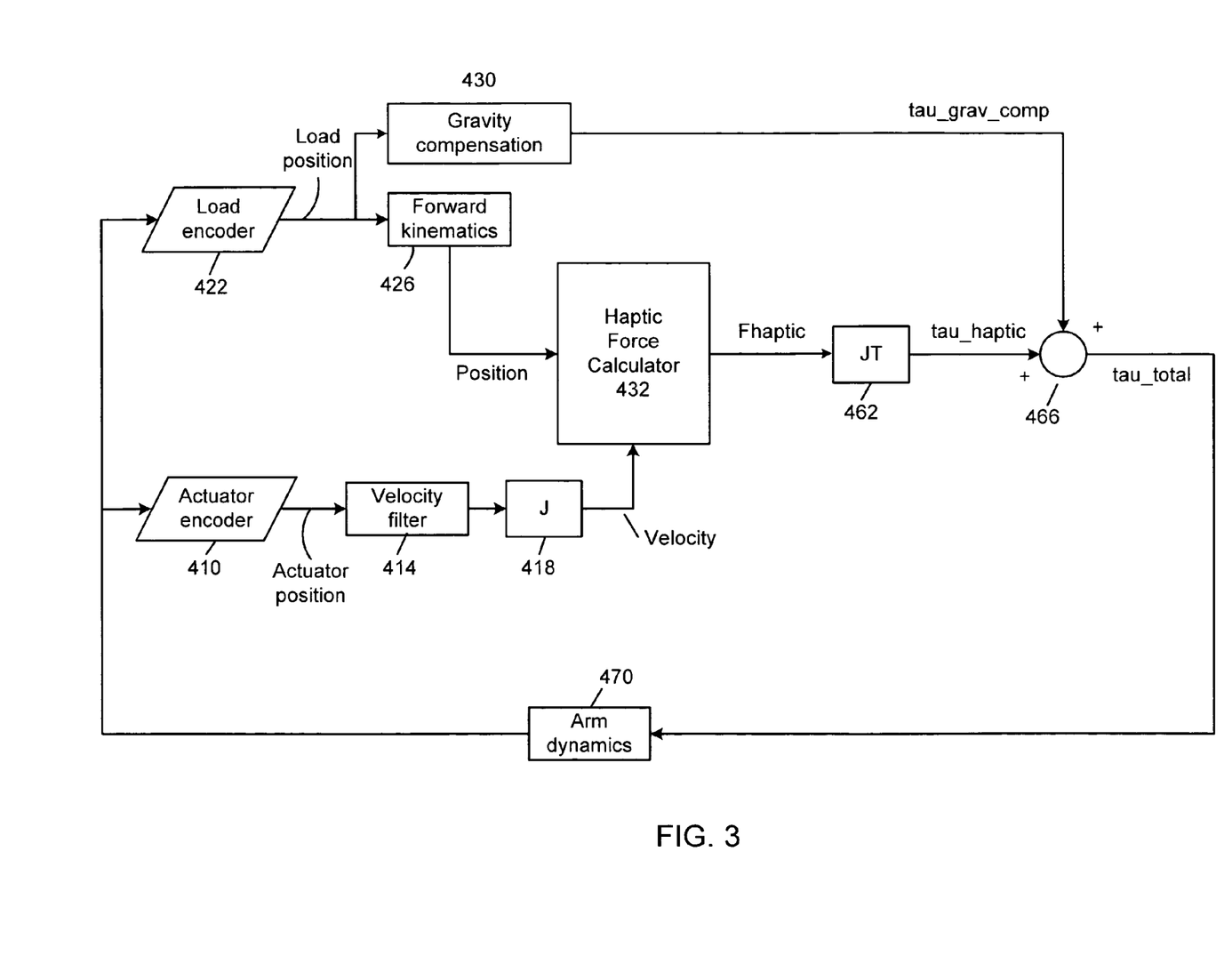
FIG. 3 is a block diagram of an embodiment of a system and process of the invention in Cartesian space.

Referring to FIG. 3, in one embodiment, a control loop is depicted in Cartesian space. The control loop may be used, for example, in combination with the HAPTIC GUIDANCE SYSTEM™ manufactured by MAKO SURGICAL CORP.®, Ft. Lauderdale, Fla., and/or the haptic device disclosed in the above-referenced U.S. Pub. No. US 2006/0142657, each of which includes a robotic arm incorporating cable drive transmissions. A tool is installed on the distal end of the arm. In this embodiment, an actuator encoder or sensor 410 measures the output position of the actuator. This output position is converted to a velocity by a velocity filter 414 by measuring the amount of actuator output position change per unit time. The velocity is operated on by a Jacobian process 418 to obtain a calculated endpoint velocity. This calculated endpoint velocity differs from the actual endpoint velocity because it does not take into account transmission and mechanical effects.

In one embodiment, the velocity filter 414 is a washout filter. A washout filter combines differentiating and smoothing functions into one filter. The washout filter can be represented as:

$$F_{WOF}(s) = \frac{s}{\frac{s}{p} + 1}$$

where p determines the location of poles and in general should be located 2~3 times faster than the fastest system pole.

In more detail, a load encoder or sensor 422 determines the load position which is an input value to a forward kinematic process 426 (which computes the Cartesian endpoint position of the arm as a function of the load position) and a gravity compensation process 430 (which computes the actuator torque or force (as determined by the type of actuator) required to counteract the gravity load on the arm links as a function of the load position). Alternatively, the gravity compensation process 430 may compute the joint torque which is then converted to actuator torque before being sent to the actuator, which is part of the haptic device arm dynamics process 470, which causes the actuator to apply torque to the system. The output value of the forward kinematic process 426, which is the current tool tip location, is an input value to a haptic controller or haptic force calculator 432. The velocity from the Jacobian process 418 is a second input to the haptic controller 432. The output of the haptic controller 432 is the haptic force (Fhaptic). The haptic force (Fhaptic) is the input to a Jacobian transpose process 462 whose output is the haptic actuator torque and/or force ($\tau_{haptic}$). Alternatively, the output is the haptic joint torque and/or force which is converted to a haptic actuator torque and/or force before being supplied to block 470.

Figure 3A:
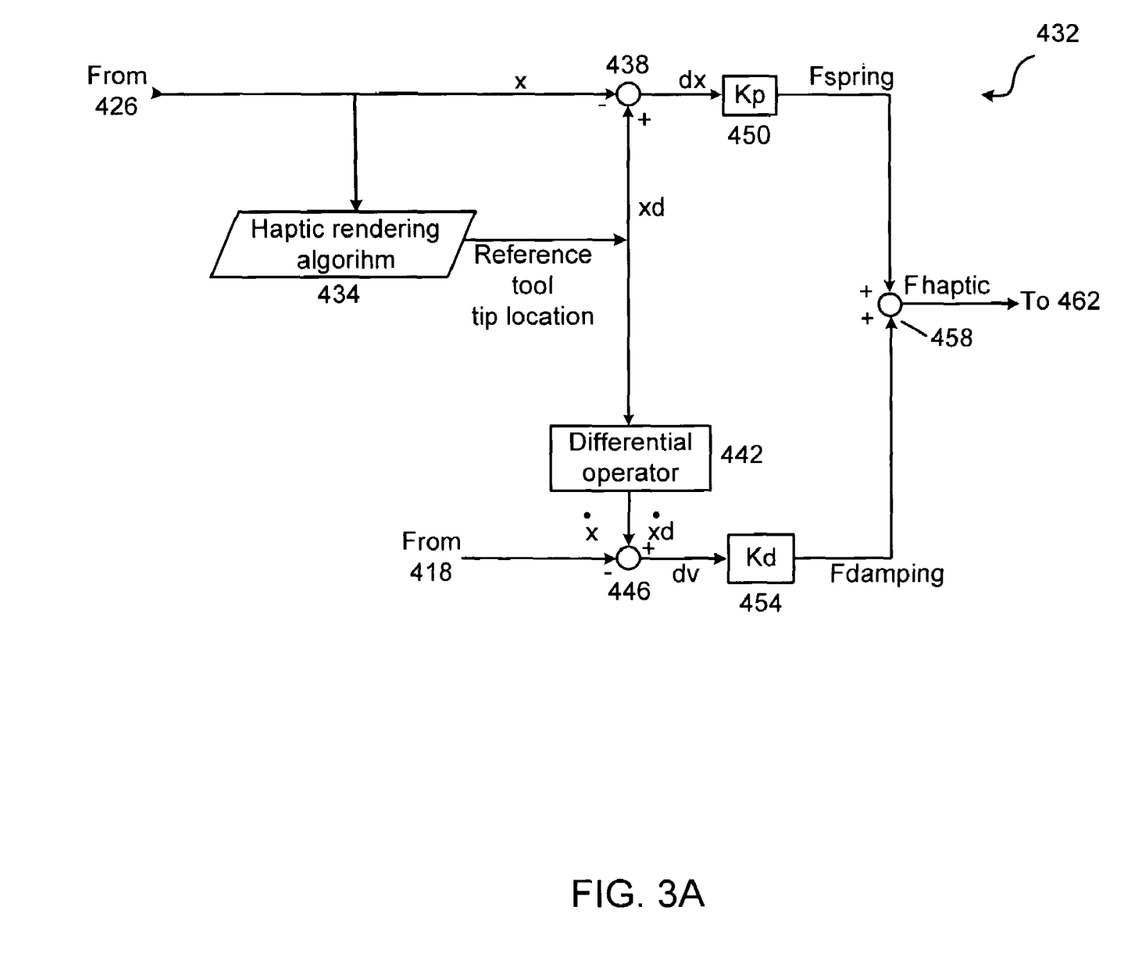
FIG. 3A is a block diagram of the haptic force calculator block of FIG. 3.

Referring to FIG. 3A, in one embodiment the haptic controller 432 includes both a haptic rendering process or algorithm 434 and an adder 438. The output of the haptic rendering process 434, which is the reference tool tip location, is one input to the adder 438. The other input to the adder 438 is the positional information from the forward kinematic process 426. The output of the adder 438 is the difference between the current tool tip location (x) and the reference tool tip location (xd) or the location deviation (dx). The haptic rendering process 434 may be, for example, a haptic rendering process as disclosed in U.S. patent application Ser. No. 11/646,204 filed on Dec. 27, 2006; a U.S. patent application 11/750,815 titled "Method and Apparatus for Controlling a Haptic Device," filed May 18, 2007; a U.S. patent application 11/750,840 titled "Method and Apparatus for Controlling a Haptic Device," filed May 18, 2007; and/or a U.S. patent application 11/750,845 titled "Method and Apparatus for Controlling a Haptic Device," filed May 18, 2007, each of which is incorporated herein by reference in its entirety.

The reference tool location (xd) from the haptic rendering algorithm 434 is also the input to a differentiator or differential operator 442 whose output ($\dot{x}d$) is the velocity of the reference tool tip location. The velocity of the reference tool tip location from the differentiator 442 is input to an adder 446 and the calculated endpoint velocity ($\dot{x}$) from the Jacobian process 418 subtracted from it. The difference between the two velocities is the velocity deviation (dv).

The location deviation (dx) is multiplied by the spring constant (Kp) 450 to obtain the spring force (Fspring), and the velocity deviation (dv) is multiplied by the damping constant (Kd) 454 to obtain the damping force (Fdamping). The damping force (Fdamping) and the spring force (Fspring) are added by an adder 458 to produce the haptic force (Fhaptic).

The haptic torques and/or force ($\tau_{haptic}$) is added to the output of the gravity compensation process 430, the gravitational compensation torque or force ($\tau$ gravity_comp), by an adder 466 to obtain the total torque or force ($\tau$ total) to be generated by the actuator. This total torque or force ($\tau$ total) is the input to the arm dynamics process of block 470 which then responds to the user interaction, anatomy interaction, and actuator forces which cause the actuator to move. The motion of the actuator again causes changes which are detected by the actuator encoder 410 and the load encoder 422, closing the control loop.

In yet another embodiment, the load encoder 422 is replaced with a direct measurement of endpoint location. In this embodiment, blocks 422 (load encoder) and 426 (forward kinematics) are not needed and a direct signal from the endpoint sensor is supplied to block 432. The gravity compensation process 430 takes its input from the actuator position output from block 410, which now must be converted to a joint angle by the gravity compensation process 430.

Figure 4:
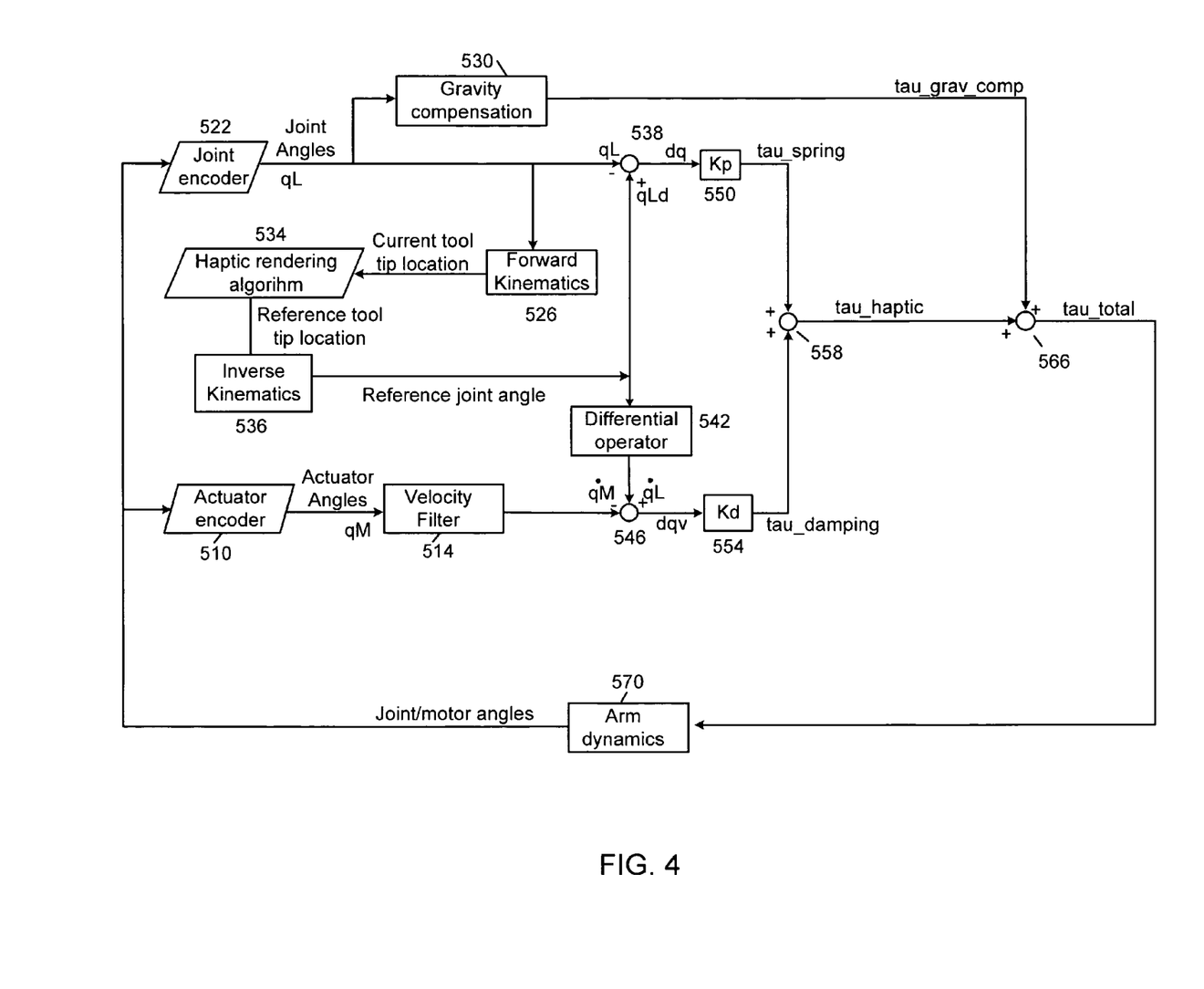
FIG. 4 is a block diagram of an embodiment of a system and process of the invention in joint space.

Referring to FIG. 4, in one embodiment, the control loop of the previous figure is depicted in joint space. In this embodiment, an actuator encoder or sensor 510 measures the output position of the actuator. This actuator output position is converted to velocity ($\dot{q}M$) by a velocity filter 514 by measuring the amount of output position change per unit time.

A joint encoder or sensor 522 determines the joint (load) position (qL) which is an input value to a forward kinematic process 526, a gravity compensation process 530, and an adder 538. The output value of the forward kinematic process 526, which is the current tool tip location, is the input value to a haptic rendering process or algorithm 534. The output of the haptic rendering process 534, which is the reference tool tip location is the input to an inverse kinematics process 536 whose output, the reference joint angle (qLd), is both the second input to the adder 538 and the input to a differentiator or differential operator 542. The output of the adder 538 is the difference between the current joint position and the reference joint position, or the joint position deviations (dq).

The output of the differentiator 542 is the desired joint velocity. The joint velocity (q̇L) from the differentiator 542 is input to an adder 546, and the velocity of the joint (q̇M) from the velocity filter 514 subtracted from it. The difference between the two is the joint velocity deviation (dqv).

The joint position deviation (dq) is multiplied by the spring constant (Kp) 550 to obtain the spring torque (τ spring), and the joint velocity deviation is multiplied by the damping constant (Kd) 554 to obtain the damping torque (τ damping). The damping torque (τ damping) and the spring torque (τ spring) are added by adder 558 to produce the haptic torque (τ haptic). The haptic torque (τ haptic) is added to the output of the gravity compensation process 530, the gravitational compensation torque (τ gravity_comp) by an adder 566 to obtain the total torque (τ total) to be generated by the actuator. This total torque (τ total) is the input to the arm dynamics process 570 which causes the actuator to apply torque to the system. The torque may cause motion which is detected by the actuator encoder 510 and the joint encoder 522, closing the control loop. Note that in the embodiment of FIG. 4, the gains Kp and Kd are multiplied by the joint angle, not the tool tip location as in FIG. 3. This implementation may be advantageous if different types of actuators are used on the system and the gains Kp and Kd must be tuned for each individual joint. It should be noted that although FIG. 4 is described in terms of a single torque or force for a single degree of freedom system, in a multi-degree of freedom system, the process may be replicated and the torques or forces added to generate the total torques or forces on the system.

Figure 4A:
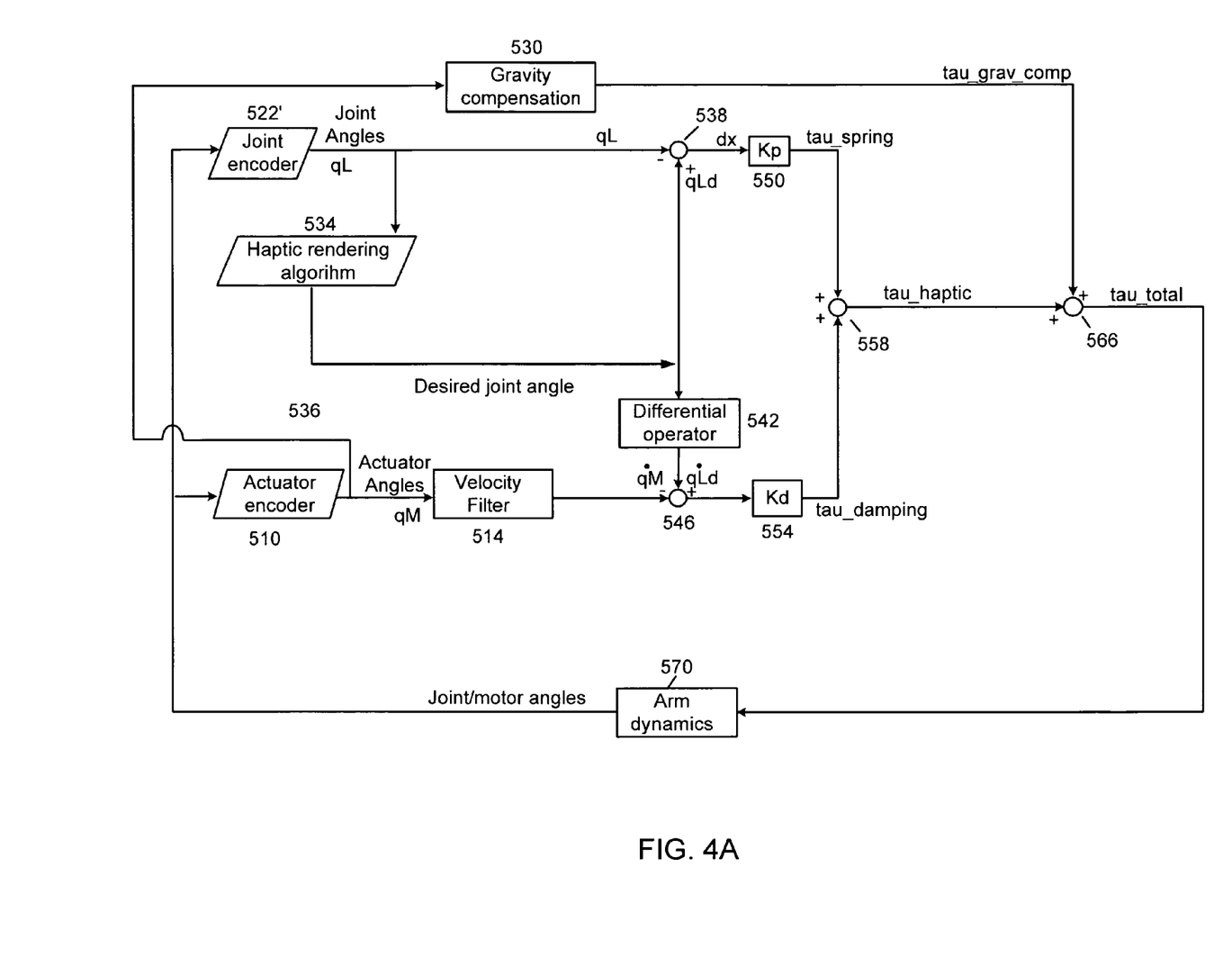
FIG. 4A is a block diagram of another embodiment of the system of FIG. 4.

Referring to FIG. 4A, yet another embodiment of the system of FIG. 4 is shown. In this embodiment, the gravity compensation block 530 obtains its input values from the output of the actuator encoder 510. Further, the forward kinematics process 526 and the inverse kinematics process 536 are eliminated. In this case, the haptic rendering algorithm 534 is used to render joint-space haptic objects and outputs the desired joint angle rather than a tool tip location. For example, a software-created joint stop or detent can be used to alter the physical behavior of the joint from the user's perspective without having to alter the physical hardware of the joint. These joint-space haptic objects can also be combined with other haptic objects by adding the tau_haptic outputs from multiple controllers shown in FIG. 3 and FIG. 4 before supplying them to the adder 566.

One advantage of the dual sensor control of the present invention is that the use of both drive and load end position sensors provides additional information that the controller can use to improve the stability of the haptic control, thereby allowing for increased haptic wall stiffness. Another advantage of the dual sensor control of the present invention is that data from the load end sensor can be compared to data from the drive end sensor to detect failures in the sensors or transmission, thereby enhancing safety of the system. Although the dual sensors may be used to compute a haptic control output in any suitable manner, using a drive end output position sensor (e.g., an actuator encoder) to provide a velocity signal and a load end output position sensor (e.g, a joint encoder) to provide a load output position signal to the control algorithm is a simple, fast method that enhances the stability and accuracy of the haptic device as compared to conventional single sensor solutions. Yet another advantage of the dual sensor control of the present invention is that data from the load end sensor can be compared to data from the drive end sensor to determine and correct for the impact of compliance and hysteresis in the cable transmission. As a result, endpoint positioning accuracy is improved.

Thus, the present invention enables a haptic device to be controlled to compensate for compliance and hysteresis in a cable transmission to enable rendering of haptic surfaces in precise locations in physical space with sufficient wall stiffness to accurately and robustly guide the actions of a user.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed. Accordingly, the scope of the invention is limited only by the scope of the appended claims.

The invention claimed is:

1. A haptic device comprising:
   an actuator;
   an actuator sensor configured to produce an actuator signal indicative of a velocity of the actuator;
   a load;
   a drive transmission coupled at a drive end with the actuator and at a load end with the load;
   a load output sensor configured to sense a position of the load and to produce a load output signal indicative of the sensed position of the load; and
   a controller in electrical communication with the load output sensor, the actuator sensor and the actuator, the controller configured to control the actuator in response to the actuator signal and the load output signal to provide a haptic response to a user.

2. The haptic device of claim 1 wherein the drive transmission is a cable drive transmission.

3. The haptic device of claim 1 wherein the controller is further configured to determine a gravity compensation torque and a Cartesian endpoint position in response to the load output signal.

4. The haptic device of claim 1 wherein the controller is further configured to control the actuator by computing an endpoint velocity by filtering the actuator signal to form a filtered actuator velocity and multiplying the filtered actuator velocity by a Jacobian.

5. The haptic device of claim 4 wherein the controller is further configured to compute a damping force by subtracting a reference velocity from the endpoint velocity to form an endpoint velocity difference and by multiplying the endpoint velocity difference by a damping gain.

6. The haptic device of claim 5 wherein the controller is further configured to compute a haptic force in response to the damping force.

7. The haptic device of claim 1 wherein the load output sensor is selected from the group consisting of an optical encoder, an electric encoder, a magnetic encoder, and a potentiometer.

8. A method for controlling an actuator of a haptic device comprising:
   producing an actuator signal indicative of a velocity of an actuator;
   sensing a position of a load using a load output sensor, wherein a drive transmission is coupled at a drive end with the actuator and at a load end with the load;
   producing a load position signal indicative of the sensed position of the load; and
   controlling the actuator in response to the actuator signal and the load position signal to produce a haptic response to a user.

9. The method of claim 8 further comprising determining a gravity compensation torque and a Cartesian endpoint position in response to the load position signal.

10. The method of claim 8 wherein controlling the actuator comprises computing an endpoint velocity by filtering the actuator signal to form a filtered actuator velocity and multiplying the filtered actuator velocity by a Jacobian.

11. The method of claim 10 further comprising computing a damping force by subtracting a reference velocity from the endpoint velocity to form an endpoint velocity difference and multiplying the endpoint velocity difference by a damping gain.

12. The method of claim 11 further comprising computing a desired haptic force in response to the damping force.

13. A haptic device comprising:
a motor;
a motor sensor configured to produce a motor signal indicative of a velocity of the motor;
a joint;
a drive transmission coupled at a drive end with the motor and at a load end with the joint;
a joint sensor configured to sense a position of the joint and to produce a joint position signal indicative of the sensed position of the joint; and
a controller in electrical communication with the joint sensor, the motor sensor and the motor, the controller configured to control the motor in response to the motor signal and the joint position signal to provide a haptic response to a user.

14. A haptic device comprising:
a transmission having an input side and an output side;
an actuator in communication with the input side;
an actuator sensor configured to produce an actuator signal indicative of an actuator velocity;
a position sensor in communication with the output side, the position sensor configured to sense a position of the output side and to produce a position signal indicative of the sensed position of the output side; and
a controller in electrical communication with the position sensor, the actuator sensor and the actuator, the controller configured to control the actuator in response to the actuator signal and the position signal to provide a haptic response to a user.

15. The haptic device of claim 14 wherein the controller is further configured to determine a gravity compensation torque and a Cartesian endpoint position in response to the position signal.

16. The haptic device of claim 14 wherein the controller is further configured to determine a damping force by subtracting a reference velocity from an endpoint velocity determined from the actuator signal to form an endpoint velocity difference and by multiplying the endpoint velocity difference by a damping gain.

17. The haptic device of claim 16 wherein the controller is further configured to compute a haptic force in response to the damping force.

18. The haptic device of claim 13 wherein the controller is further configured to determine a gravity compensation torque and a Cartesian endpoint position in response to the joint position signal.

19. The haptic device of claim 13 wherein the controller is further configured to determine a damping force by subtracting a reference velocity from an endpoint velocity determined from the motor signal to form an endpoint velocity difference and by multiplying the endpoint velocity difference by a damping gain.

20. The haptic device of claim 19 wherein the controller is further configured to compute a haptic force in response to the damping force.

* * * * *